US012023911B2

(12) United States Patent
Ueda et al.

(10) Patent No.: US 12,023,911 B2
(45) Date of Patent: Jul. 2, 2024

(54) INKJET RECORDING APPARATUS

(71) Applicant: KYOCERA Document Solutions Inc., Osaka (JP)

(72) Inventors: Hiroyuki Ueda, Osaka (JP); Shuji Osaki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 121 days.

(21) Appl. No.: 17/977,820

(22) Filed: Oct. 31, 2022

(65) Prior Publication Data

US 2023/0146622 A1 May 11, 2023

(51) Int. Cl.
*B41J 11/00* (2006.01)

(52) U.S. Cl.
CPC ........ *B41J 11/0085* (2013.01); *B41J 11/0045* (2013.01)

(58) Field of Classification Search
CPC .. B41J 29/377; B41J 2/04566; B41J 2/04586; B41J 11/0085; B41J 11/0045
See application file for complete search history.

(56) References Cited

U.S. PATENT DOCUMENTS

2011/0109690 A1* 5/2011 Kida .................... B41J 2/16585 347/25
2016/0129712 A1 5/2016 Yoshinaga et al.
2016/0176211 A1* 6/2016 Takenaka ............... B41J 11/007 347/8
2016/0257142 A1 9/2016 Soda et al.

FOREIGN PATENT DOCUMENTS

JP 2016-87958 A 5/2016
JP 2016-168781 A 9/2016

* cited by examiner

*Primary Examiner* — Thinh H Nguyen
(74) *Attorney, Agent, or Firm* — Stein IP, LLC

(57) ABSTRACT

An inkjet recording apparatus includes a sheet conveyance portion, a pair of registration rollers, a recording portion, a plate portion, a suction roller, and an exhaust portion. The exhaust portion is disposed over an area from upstream of the recording portion to upstream of the pair of registration rollers with respect to the sheet conveyance direction and sucks air from above the conveyance belt and the plate portion in the direction away from the conveyance belt. The exhaust portion includes an exhaust hood and an exhaust fan. The exhaust fan guides the air in the exhaust hood through an air inlet into a recording portion housing and then passes the air through an exhaust outlet to discharge it via an air flow passage.

8 Claims, 3 Drawing Sheets

INKJET RECORDING APPARATUS

INCORPORATION BY REFERENCE

This application is based on and claims the benefit of priority from Japanese Patent Application No. 2021-181077 filed on Nov. 5, 2021, the contents of which are hereby incorporated by reference.

BACKGROUND

The present disclosure relates to an inkjet recording apparatus.

Inkjet recording apparatuses which record images by ejecting ink from nozzles provided in a recording head are widely used, as recording devices such as facsimile machines, copiers, and printers, for their ability to record high-definition images.

SUMMARY

According to one aspect of the present disclosure, an inkjet recording apparatus includes a sheet conveyance portion, a pair of registration rollers, a recording portion, a plate portion, a suction roller, and an exhaust portion. The sheet conveyance portion includes an endless conveyance belt and conveys a sheet. The pair of registration rollers feeds the sheet toward the sheet conveyance portion. The recording portion is disposed opposite the outer circumferential surface of the conveyance belt, includes a recording head ejecting ink, and records an image by ejecting the ink to the sheet conveyed by the conveyance belt. The plate portion is adjacent to, upstream of, the recording portion with respect to the sheet conveyance direction, is disposed opposite the outer circumferential surface of the conveyance belt, and extends in the sheet conveyance direction and in the sheet width direction orthogonal to the sheet conveyance direction. The suction roller is adjacent to, upstream of, the plate portion with respect to the sheet conveyance direction, is disposed opposite the outer circumferential surface of the conveyance belt, and brings the sheet into contact with the outer circumferential surface of the conveyance belt. The exhaust portion is disposed over an area from upstream of the recording portion to upstream of the pair of registration rollers with respect to the sheet conveyance direction and sucks air from above the conveyance belt and the plate portion in the direction away from the conveyance belt. The recording portion includes a recording portion housing. The recording portion housing holds the recording head and has an air inlet, an exhaust outlet, and an air flow passage disposed between the air inlet and the exhaust outlet, adjacent to the recording head. The exhaust portion includes an exhaust hood and an exhaust fan. The exhaust hood extends in the sheet conveyance direction and in the sheet width direction from upstream of the recording portion to upstream of the pair of registration rollers with respect to the sheet conveyance direction and covers above the conveyance belt, the plate portion, the suction roller, and the pair of registration rollers. The exhaust fan guides the air in the exhaust hood through the air inlet into the recording portion housing and then passes the air through the exhaust outlet to discharge the air via the air flow passage.

BRIEF DESCRIPTION OF THE DRAWINGS

FIG. 2 is a top view around a recording portion in the inkjet recording apparatus in

FIG. 1.

DETAILED DESCRIPTION

Hereinafter, an embodiment of the present disclosure will be described with reference to the drawings. The present disclosure is not limited to the following description.

Figure 1:
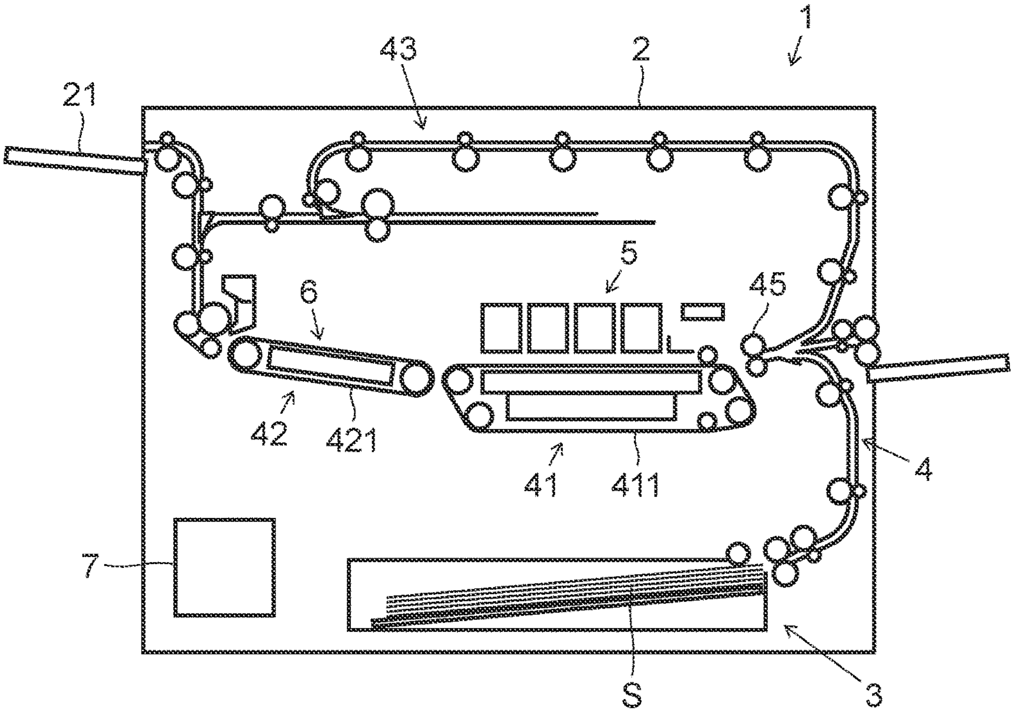
FIG. 1 is a schematic sectional front view of an inkjet recording apparatus according to one embodiment of the present disclosure.
Figure 2:
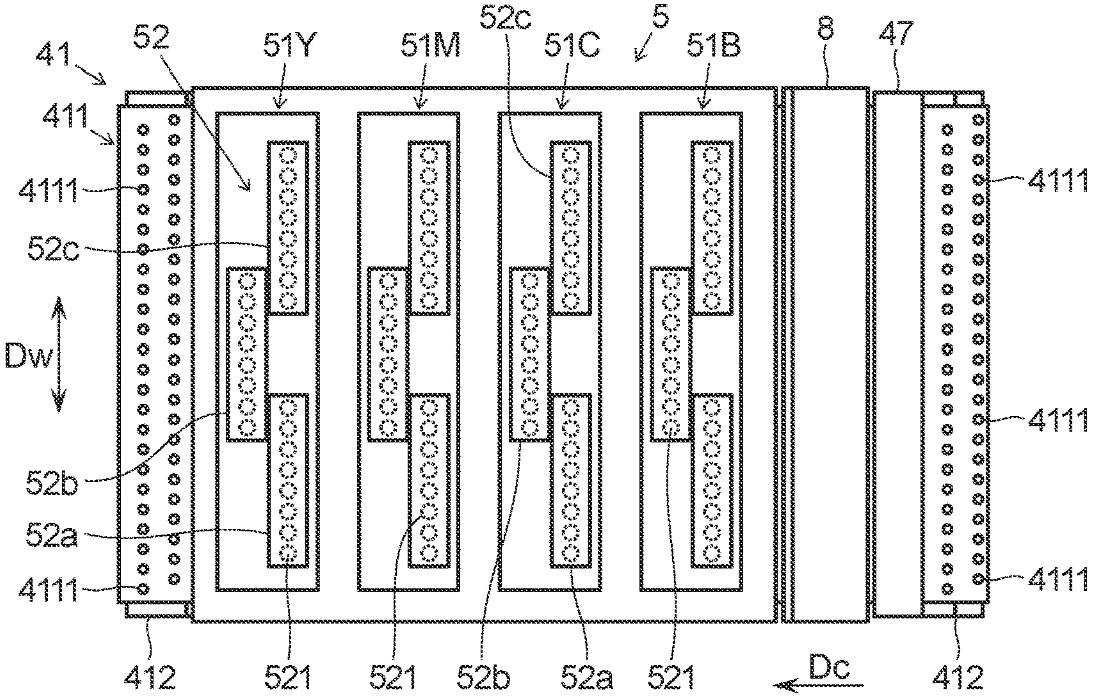
Figure 3:
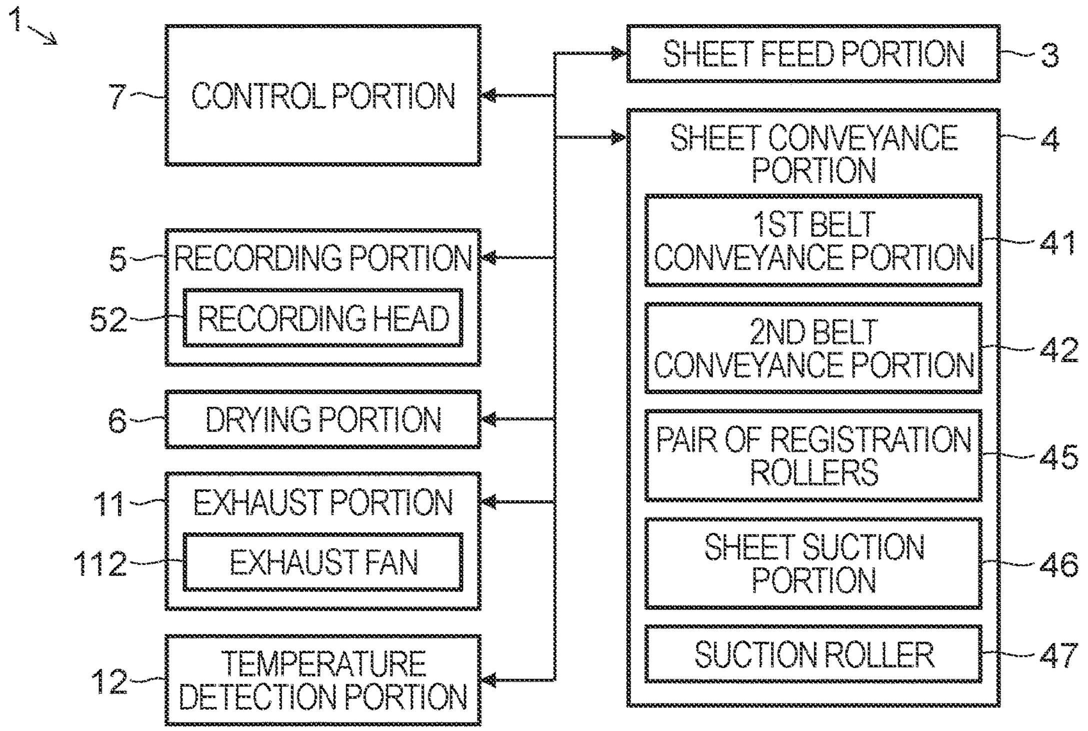
FIG. 3 is a block diagram showing the schematic configuration of the inkjet recording apparatus in FIG. 1.

FIG. 1 is a schematic sectional front view of an inkjet recording apparatus 1 according to an embodiment. FIG. 2 is a top view around a recording portion 5 in the inkjet recording apparatus 1 in FIG. 1. FIG. 3 is a block diagram showing a schematic configuration of the inkjet recording apparatus 1 in FIG. 1. The inkjet recording apparatus 1 is, for example, an inkjet recording printer. The inkjet recording apparatus 1 includes, as shown in FIGS. 1, 2, and 3, an apparatus main body 2, a sheet feed portion 3, a sheet conveyance portion 4, a recording portion 5, a drying portion 6, and a control portion 7.

The sheet feed portion 3 is disposed in a lower part of the apparatus main body 2. The sheet feed portion 3 stores a plurality of sheets (a recording medium) S and, during recording, separates and feeds out the sheets S one by one. The sheet conveyance portion 4 conveys a sheet S fed out from the sheet feed portion 3 to the recording portion 5 and then to the drying portion 6 and then, after recording and drying, discharges the sheet S to a sheet discharge portion 21. When duplex recording is performed, the sheet conveyance portion 4 distributes the sheet S after recording and drying on the first side to a reversing conveyance portion 43 and then conveys the sheet S having its conveyance direction switched and having its obverse and reverse sides reversed back to the recording portion 5 and the drying portion 6.

The sheet conveyance portion 4 includes a first belt conveyance portion 41 and a second belt conveyance portion 42. The first and second belt conveyance portions 41 and 42 convey the sheet S in a state held by suction on the outer circumferential surfaces (top surfaces) of the first and second conveyance belts 411 and 421 respectively, which are each formed in an endless shape. The first belt conveyance portion 41 is disposed below the recording portion 5 to convey the sheet S. The second belt conveyance portion 42 is located downstream of the first belt conveyance portion 41 in the sheet conveyance direction, and is disposed in the drying portion 6 to convey the sheet S.

The recording portion 5 is disposed opposite the outer circumferential surface (top surface) of the first conveyance belts 411. That is, the recording portion 5 faces the conveying sheet S conveyed in a state held by suction on the outer circumferential surface (top surface) of the first conveyance belt 411. The recording portion 5 is disposed above the first conveyance belt 411, at a predetermined interval from it.

The recording portion 5 holds head units 51B, 51C, 51M, and 51Y corresponding to four colors, namely black, cyan, magenta, and yellow respectively. The head units 51B, 51C. 51M, and 51Y are arranged side by side along the sheet conveyance direction De so that the longitudinal direction is parallel to the sheet width direction Dw, which is orthogonal to the sheet conveyance direction De. The four head units 51B, 51C, 51M, and 51Y have a similar basic configuration, and accordingly hereinafter, unless necessary, the suffixes "B". "C". "M", and "Y" for distinction may be omitted in the following description.

The head units 51 for the different colors each include line inkjet recording heads 52. In each of the head units 51 for the different colors, a plurality of recording heads 52 (for example, three (52*a*, 52*b*, 52*c*)) are arranged in a staggered array along the sheet width direction Dw.

The recording head 52 includes a plurality of ink ejection nozzles 521 at its bottom. The plurality of ink ejection nozzles 521 are arranged in rows along the sheet width direction Dw so as to be able to eject ink over the entire recording area on the sheet S. That is, the recording head 52 includes a plurality of ink ejection nozzles 521 which ejects ink onto the sheet S. The recording portion 5 ejects ink sequentially from the recording heads 52 of the head units 51B, 51C, 51M, and 51Y corresponding to the four colors to the sheet S conveyed in a state held by suction on the first conveyance belt 411 and records a full-color or monochrome image on the sheet S.

The drying portion 6 is disposed downstream of the recording portion 5 in the sheet conveyance direction De and includes the second belt conveyance portion 42. While the sheet having the ink image recorded on it in the recording portion 5 is being conveyed in a state held by suction on the second conveyance belt 421 in the drying portion 6, the ink is dried.

The control portion 7 includes a CPU, a storage portion, and other electronic circuits and components (of which none are illustrated). Based on control data and programs stored in the storage portion, the CPU controls the operation of different components in the inkjet recording apparatus 1 to perform processes related to the functions of the inkjet recording apparatus 1. The sheet feed portion 3, the sheet conveyance portion 4, the recording portion 5, and the drying portion 6 individually receive instructions from the control portion 7 and performs recording on the sheet S in coordination.

Figure 4:
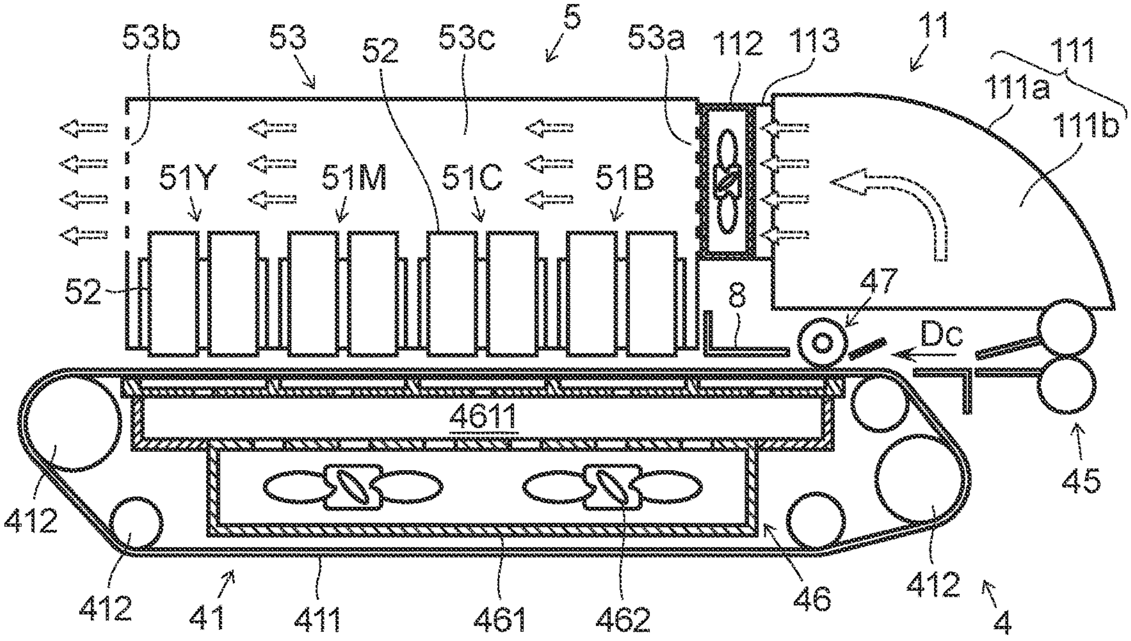
FIG. 4 is a part sectional front view around the recording portion in the inkjet recording apparatus in FIG. 1.
Figure 5:
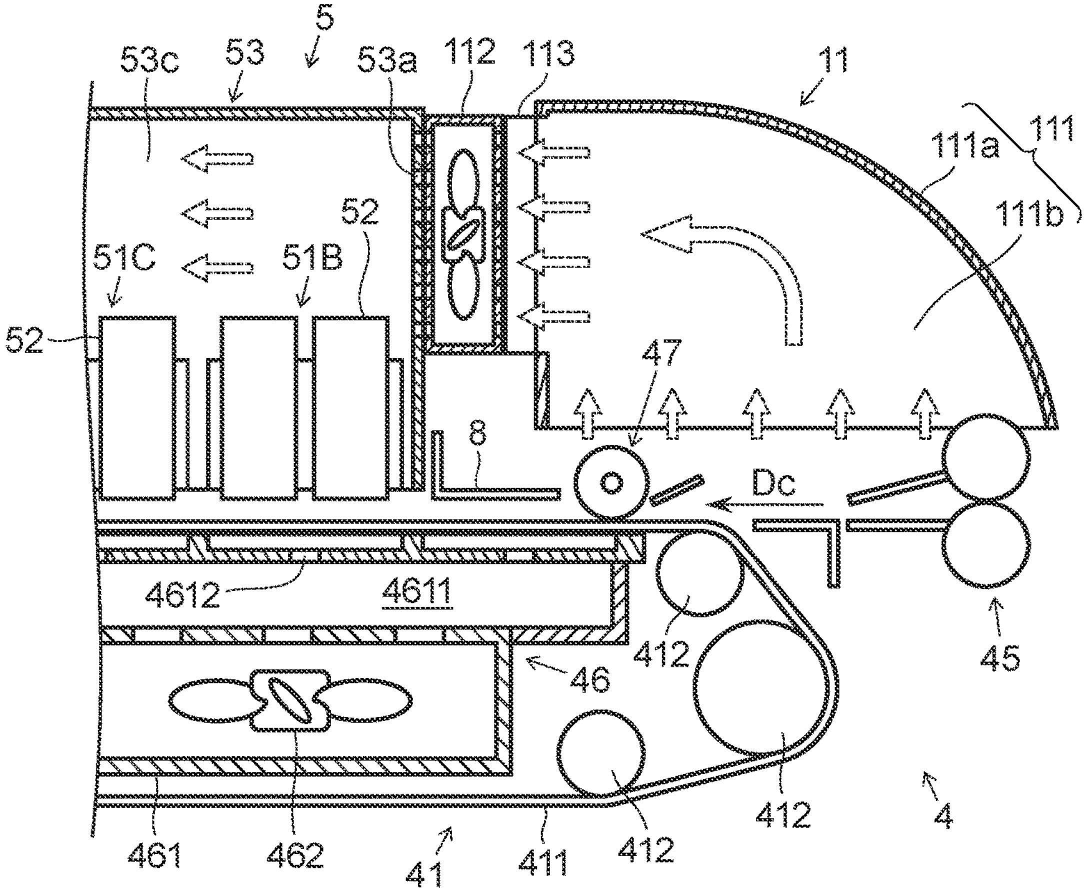
FIG. 5 is a part sectional front view of an upstream side, in the sheet conveyance direction, around the recording portion in FIG. 4.

FIG. 4 is a part sectional front view around the recording portion 5 in the inkjet recording apparatus 1 in FIG. 1. FIG. 5 is a part sectional front view of the upstream side, in the sheet conveyance direction Dc, around the recording portion 5 in FIG. 4. A hollow broken line arrow in FIGS. 4 and 5 indicates an airflow, along with its direction, that is caused when an exhaust portion 11, which will be described later, is driven.

The recording portion 5 includes a recording portion housing 53. The recording portion housing 53 is formed, for example, in the shape of a substantially rectangular parallelepiped box extending in the sheet conveyance direction Dc and in the sheet width direction Dw. The recording portion housing 53 holds and stores the head units 51 inside. That is, the recording portion housing 53 holds the recording heads 52.

The bottom face of the recording portion housing 53 faces the sheet conveyance surface of the first conveyance belt 411. The bottom faces of the recording heads 52, which have a plurality of ink ejection nozzles 521, are exposed to the outside at the bottom face of the recording portion housing 53. The recording portion housing 53 includes an air inlet 53*a*, an exhaust outlet 53*b*, and an air flow passage 53*c*.

The air inlet 53*a* is disposed in an upstream end part, in the sheet conveyance direction De, of the recording portion housing 53. The air inlet 53*a* opens the recording portion housing 53 in the sheet conveyance direction Dc. The exhaust outlet 53*b* is disposed in a downstream end part, in the sheet conveyance direction Dc, of the recording portion housing 53. The exhaust outlet 53*b* opens the recording portion housing 53 in the sheet conveyance direction Dc.

The air flow passage 53*c* is located between the air inlet 53*a* and the exhaust outlet 53*b*. The air flow passage 53*c* is located, for example, above the recording heads 52, is disposed adjacent to the recording heads 52, and extends in the sheet conveyance direction Dc. In the air flow passage 53*c*, air flows from the air inlet 53*a* to the exhaust outlet 53*b*.

As shown in FIGS. 4 and 5, the sheet conveyance portion 4 further includes a pair of registration rollers 45, a sheet suction portion 46, and a suction roller 47.

The pair of registration rollers 45 is disposed downstream of the sheet feed portion 3 in the sheet conveyance direction De. Closely downstream of the pair of registration rollers 45 in the sheet conveyance direction Dc, the first belt conveyance portion 41 and the recording portion 5 are disposed. Each roller in the pair of registration rollers 45 is supported rotatably about a rotation axis extending along the sheet width direction Dw (see FIG. 2).

The sheet S fed out from the sheet feed portion 3 reaches the pair of registration rollers 45 via the sheet conveyance portion 4. The control portion 7 makes the pair of registration rollers 45 correct skewed feeding of the sheet S and, in coordination with ink ejection operation by the recording unit 5, feeds the sheet S toward the first belt conveyance portion 41. That is, the pair of registration rollers 45 corrects skewed feeding of the sheet S and feeds out the sheet S toward the first belt conveyance portion 41.

The sheet conveyance portion 4 includes a registration sensor (not illustrated). The registration sensor is closely upstream of the pair of registration rollers 45 in the sheet conveyance direction Dc. The registration sensor detects the sheet S which is fed out from the sheet feed portion 3 and reaches the pair of registration rollers 45. Based on a detection signal regarding the sheet S received from the registration sensor, the control portion 7, controls the rotation of the pair of registration rollers 45.

The first belt conveyance portion 41 is disposed below the recording portion 5. The first belt conveyance portion 41 sucks and holds the sheet S on its top surface and conveys the sheet S along the sheet conveyance direction De. The first belt conveyance portion 41 includes the first conveyance belt 411 and a roller 412.

The first conveyance belt 411 is an endless belt and is wound around a plurality of rollers 412 disposed at the inner circumferential side. The rollers 412 are disposed at the inner circumferential side of the first conveyance belt 411 and are supported rotatably about a rotation axis extending along the sheet width direction Dw (see FIG. 2). One of the plurality of rollers 412 is a driving roller and the first conveyance belt 411 is rotated by the driving roller so that its upper side moves in the sheet conveyance direction Dc.

As shown in FIG. 2, the first conveyance belt 411 has a plurality of air holes 4111. The air holes 4111 penetrates the first conveyance belt 411 from its obverse to reverse side. The outer circumferential surface of the first conveyance belt 411 is the sheet conveyance surface. The sheet S is held on the sheet conveyance surface of the first conveyance belt 411 and is conveyed to a position that faces the recording heads 52.

The sheet suction portion 46 is disposed at the inner circumferential side of the first conveyance belt 411. More specifically, the sheet suction portion 46 is located in an upper part at the inner circumferential side of the first conveyance belt 411 and is disposed opposite the inner circumferential surface (obverse surface) of the upper side of the first conveyance belt 411, that is, its surface opposite from the sheet conveyance surface. The sheet suction portion 46 includes a housing 461 and an air suction fan 462.

The housing 461 is formed, for example, in the shape of a substantially rectangular parallelepiped box and has a suction chamber 4611 surrounded by walls. The suction chamber 4611 faces the inner circumferential surface (obverse surface) of the upper side of the first conveyance belt 411, that is, its surface opposite from the sheet conveyance surface, over an area from below upstream of the black head unit 51B in the sheet conveyance direction De to below the yellow head unit 51Y.

The housing 461 includes a plurality of air suction holes 4612 disposed in its top face, over the suction chamber 4611. The plurality of air suction holes 4612 penetrates the top surface of the housing 461 in the up-down direction.

The air suction fan 462 is disposed inside the housing 461, in a lower part of a suction chamber 4611. When the air suction fan 462 is driven, the sheet suction portion 46, by sucking air through the air suction holes 4612 and the air holes 4111 (see FIG. 2), sucks and holds the sheet S on the sheet conveyance surface of the first conveyance belt 411.

The suction roller 47 is disposed upstream of the recording portion 5 in the sheet conveyance direction De, closely upstream of a plate portion 8, which will be described later. The suction roller 47 is disposed in an upstream end part of the sheet suction portion 46, opposite the sheet conveyance surface of the first conveyance belt 411. In other words, the suction roller 47 is disposed above an upstream end part of the housing 461 in the sheet conveyance direction Dc, across the first conveyance belt 411. The suction roller 47 is supported rotatably about a rotation axis extending along the sheet width direction Dw (see FIG. 2).

The outer circumferential surface of the suction roller 47 lies in contact with the sheet conveyance surface of the first conveyance belt 411. The suction roller 47, for example by staying in contact with the first conveyance belt 411, rotates so as to follow the first conveyance belt 411. The suction roller 47 brings the sheet S conveyed from the pair of registration rollers 45 into contact with the sheet conveyance surface of the first conveyance belt 411.

The inkjet recording apparatus 1 includes the plate portion 8 shown in FIGS. 4 and 5. The plate portion 8 is disposed adjacent to the upstream side of the recording portion 5 in the sheet conveyance direction De. The plate portion 8 is disposed opposite the sheet conveyance surface of the first conveyance belt 411 at the downstream side of the suction roller 47. In other words, the plate portion 8 is disposed above the upstream part in the sheet conveyance direction De of the housing 461 with the first conveyance belt 411 interposed therebetween.

The plate portion 8 is disposed above the first conveyance belt 411, at a predetermined interval from it. The plate portion 8 extends in the sheet conveyance direction Dc and the sheet width direction Dw (see FIG. 2). The plate portion 8, for example, extends parallel to the sheet conveyance surface of the first conveyance belt 411.

The inkjet recording apparatus 1 includes an exhaust portion 11 shown in FIGS. 4 and 5. The exhaust portion 11 is disposed over an area from upstream of the recording portion 5 in the sheet conveyance direction De to upstream of the pair of registration rollers 45. The exhaust portion 11 is placed above the sheet conveyance path. The exhaust portion 11 faces, at its air suction side, the sheet conveyance surface of the first conveyance belt 411, that is, the sheet S conveyed along the first conveyance belt 411. The exhaust portion 11 includes an exhaust hood 111, an exhaust fan 112, and a paper dust collection filter 113.

The exhaust hood 111 extends in the sheet conveyance direction De and in the sheet width direction Dw, from upstream of the recording portion 5 in the sheet conveyance direction De to upstream of the pair of registration rollers 45. The exhaust hood 111 covers above the first conveyance belt 411, the plate portion 8, the suction roller 47, and the pair of registration rollers 45.

Specifically, the exhaust hood 111 includes, for example, an upper plate 111*a* and a side plate 111*b*. The upper plate 111*a* extends in the sheet conveyance direction De and in the sheet width direction Dw, upstream from a point adjacent to an upstream end part of the recording portion 5 in the sheet conveyance direction De, and extends downward with a curve over an area from above the pair of registration rollers 45 upstream. The side plate 111*b* is connected to each of a front end part and a rear end part of the upper plate 111*a* in the sheet width direction (at the near side and at the far side in the depth direction with respect to the plane of FIG. 5). The side plate 111*b* extends downward from an edge part of the upper plate 111*a* in the sheet width direction Dw, in the up-down direction and in the sheet conveyance direction Dc.

The exhaust fan 112 is connected to a downstream end part of the exhaust hood 111 in the sheet conveyance direction Dc. The exhaust hood 111 opens, at a part of it connected to the exhaust fan 112, in the sheet conveyance direction Dc. The air suction side of the exhaust fan 112 faces upstream in the sheet conveyance direction De and faces the internal space of the exhaust hood 111. A plurality of exhaust fans 112 may be arranged in rows in the sheet width direction Dw. The exhaust fan 112 is configured with, for example, an axial fan, though it may be a centrifugal fan such as a sirocco fan or a turbo fan. The exhaust fan 112 sucks the air in the exhaust hood 111 along the sheet conveyance direction De.

The exhaust fan 112 is placed upstream of the recording portion 5 in the sheet conveyance direction Dc. The exhaust fan 112 guides the air in the exhaust hood 111 through the air inlet 53*a* into the recording portion housing 53. The exhaust fan 112 then discharges the air guided through the air inlet 53*a* into the recording portion housing 53 through the exhaust outlet 53*b* via the air flow passage 53*c*.

The paper dust collection filter 113 is arranged at least at one of the air inlet 53*a* side and the exhaust outlet 53*b* side of the recording portion housing 53. In the embodiment, the paper dust collection filter 113 is disposed at the air inlet 53*a* side of the recording portion housing 53. Thus, it is possible to make it difficult for paper dust to enter the air flow passage 53*c* located above the recording heads 52. The paper dust collection filter 113 collects paper dust in the airflow generated by the exhaust fan 112.

When the exhaust portion 11 is driven, the exhaust portion 11 sucks air upward with respect to the first conveyance belt 411. In other words, the exhaust portion 11 sucks air from above the first conveyance belt 411 and the plate portion 8 into the exhaust hood 111 in the direction away from the first conveyance belt 411. The exhaust portion 11 then directs the air in the exhaust hood 111 into the recording portion housing 53, pass it through the air flow passage 53*c*, and discharges it.

With the above configuration, the exhaust portion 11 sucks and discharges, along with air, paper dust on the first conveyance belt 411 over an area upstream of the recording portion 5 in the sheet conveyance direction De and paper dust floating above the first conveyance belt 411 and the plate portion 8. Thus, it is possible to effectively remove paper dust flying from the sheet S. Additionally, by circulating the air for removing paper dust through the recording portion housing 53, it is possible to suppress an unintended rise in the temperature of the recording heads 52. In this way, it is possible to suppress ejection failure of the recording heads 52 caused by paper dust and a rise in the temperature of the recording heads 52.

At the exhaust side of the recording portion housing 53, for example, an exhaust duct (not illustrated) that extends to the external wall of the apparatus main body 2 is provided.

Specifically, the exhaust fan 112 is disposed adjacent to the air inlet 53*a* of the recording portion housing 53, upstream of it in the air flow direction. The paper dust collection filter 113 is disposed upstream or downstream of the exhaust fan 112 in the air flow direction. In the embodiment, the paper dust collection filter 113 is disposed upstream of the exhaust fan 112 in the air flow direction.

With the above configuration, it is possible to suck and discharge paper dust along with air efficiently over an area from upstream of the recording portion 5 in the sheet conveyance direction De to upstream of the pair of registration rollers 45. Thus, it is possible to remove paper dust flying from the sheet S more effectively. It is also possible to prevent paper dust from flowing into the recording portion housing 53 and to prevent paper dust from sticking to the exhaust fan 112.

During image recording, the control portion 7 rotates the exhaust fan 112 at a first rotation speed. By contrast, during non-image recording, the control portion 7 rotates the exhaust fan 112 at a second rotation speed, which is lower than the first rotation speed.

During image recording, that is, when a sheet S is being conveyed, paper dust is likely to fly: thus, by rotating the exhaust fan 112 at the first, higher, rotation speed, it is possible to effectively remove paper dust flying from the sheet S. By contrast, during non-image recording, that is, when no sheet S is being conveyed, paper dust does not fly: thus, by rotating the exhaust fan 112 at the second, lower, rotation speed, it is possible to perform only the cooling of the recording heads 52. It is thus possible to reduce the power consumption of the inkjet recording apparatus 1.

When the control unit 7 detects the inkjet recording apparatus 1 being shut down, it keeps the exhaust fan 112 rotating for a predetermined period of time and then stops it. The recording heads 52 may still heat up even after the inkjet recording apparatus 1 is shut down. Thus, with this configuration, after the inkjet recording apparatus 1 is shut down, it is possible to cool the recording heads 52 with the exhaust fan 112.

The inkjet recording apparatus 1 includes a temperature detection portion 12 (see FIG. 3). The temperature detection portion 12 is configured with, for example, a thermistor or the like and is disposed close to the exterior of the apparatus main body 2. The detection portion 12 detects the ambient air temperature around the inkjet recording apparatus 1. A detection signal as to the ambient air temperature from the temperature detection portion 12 is transmitted to the control portion 7.

When the ambient air temperature detected by the temperature detection portion 12 is less than a predetermined value, the control portion 7 rotates the exhaust fan 112 during image recording and, stops the rotation of the exhaust fan 112 during non-image recording. Cooling the recording heads 52 more than necessary may change the characteristics of ink and may lead to degraded image quality. Thus, with this configuration, when the ambient air temperature is less than the predetermined value, it is possible to prevent the recording heads 52 from being overcooled during non-image recording.

In the configuration described above, the recording heads 52 are configured with line inkjet recording heads. This makes it possible to effectively remove paper dust flying from the sheet S onto the line inkjet recording heads and to suppress ejection failure caused by paper dust. The recording heads are not limited to the line type and the configuration of the embodiment can be applied even to a serial type.

While an embodiment of the present disclosure has been described above, it is not meant to limit the scope of the present disclosure, which thus encompasses any modifications made without departure from the scope and sense equivalent to those claims.

What is claimed is:

1. An inkjet recording apparatus comprising:

a sheet conveyance portion including an endless conveyance belt, the sheet conveyance portion conveying a sheet;

a pair of registration rollers which feeds the sheet toward the sheet conveyance portion;

a recording portion disposed opposite an outer circumferential surface of the conveyance belt and including a recording head ejecting ink, the recording portion recording an image by ejecting the ink to the sheet conveyed by the conveyance belt;

a plate portion adjacent to, upstream of, the recording portion with respect to a sheet conveyance direction and disposed opposite the outer circumferential surface of the conveyance belt, the plate portion extending in the sheet conveyance direction and in a sheet width direction orthogonal to the sheet conveyance direction;

a suction roller adjacent to, upstream of, the plate portion with respect to the sheet conveyance direction and disposed opposite the outer circumferential surface of the conveyance belt, the suction roller bringing the sheet into contact with the outer circumferential surface of the conveyance belt; and an exhaust portion disposed over an area from upstream of the recording portion to upstream of the pair of registration rollers with respect to the sheet conveyance direction, the exhaust portion sucking air from above the conveyance belt and the plate portion in a direction away from the conveyance belt, wherein the recording portion holds the recording head and includes a recording portion housing having an air inlet, an exhaust outlet, and an air flow passage disposed between the air inlet and the exhaust outlet, adjacent to the recording head, and the exhaust portion includes:

an exhaust hood extending in the sheet conveyance direction and in the sheet width direction from upstream of the recording portion to upstream of the pair of registration rollers with respect to the sheet conveyance direction, the exhaust hood covering above the conveyance belt, the plate portion, the suction roller, and the pair of registration rollers extends, and an exhaust fan which guides the air in the exhaust hood through the air inlet into the recording portion housing and which then pass the air through the exhaust outlet to discharge the air via the air flow passage.

2. The inkjet recording apparatus according to claim 1, further comprising:

a paper dust collection filter arranged at least at one of an air inlet side and an exhaust outlet side of the recording portion housing, the paper dust collection filter collecting paper dust in an airflow generated by the exhaust fan.

3. The inkjet recording apparatus according to claim 2, wherein the exhaust fan is disposed adjacent to, upstream of, the air inlet with respect to an air flow direction, and the paper dust collection filter is disposed upstream or downstream of the exhaust fan with respect to the air flow direction.

4. The inkjet recording apparatus according to claim 1, further comprising:

a control portion which controls operation of the recording head and the exhaust fan, wherein the control portion rotates the exhaust fan at a first rotation speed during image recording, and rotates the exhaust fan at a second rotation speed, which is lower than the first rotation speed, during non-image recording.

5. The inkjet recording apparatus according to claim 1, further comprising:

a control portion which controls operation of the recording head and the exhaust fan, wherein on detecting the inkjet recording apparatus being shut down, the control portion keeps the exhaust fan rotating for a predetermined period of time and then stops the exhaust fan.

6. The inkjet recording apparatus according to claim 1, further comprising:

a temperature detection portion which detects an ambient air temperature; and a control portion which controls operation of the recording head and the exhaust fan, wherein if the ambient air temperature detected by the temperature detection portion is less than the predetermined value, the control portion rotates the exhaust fan during image recording, and stops rotation of the exhaust fan during non-image recording.

7. The inkjet recording apparatus according to claim 1, wherein the conveyance belt has a plurality of air holes, and the sheet conveyance portion is disposed at an inner circumferential side of the conveyance belt, includes a suction fan which sucks air through the air holes, and has a sheet suction portion which holds by suction the sheet on the outer circumferential surface of the conveyance belt.

8. The inkjet recording apparatus according to claim 1, wherein the recording head is configured with a line inkjet recording head.

* * * * *